US012687382B1

(12) United States Patent
DeFazio et al.

(10) Patent No.: US 12,687,382 B1
(45) Date of Patent: Jul. 21, 2026

(54) CHASSIS SAG AND BOW MEASUREMENT SYSTEM

(71) Applicant: AMD Design, LLC, Wilmington, DE (US)

(72) Inventors: JonCarlo DeFazio, Secaucus, NJ (US); Atticus Bowie, Secaucus, NJ (US); Peter Alex Lescaille, Secaucus, NJ (US)

(73) Assignee: AMD Design, LLC, Wilmington, DE (US)

( * ) Notice: Subject to any disclaimer, the term of this patent is extended or adjusted under 35 U.S.C. 154(b) by 369 days.

(21) Appl. No.: 18/426,615

(22) Filed: Jan. 30, 2024

(51) Int. Cl.
 *G01B 7/28* (2006.01)
 *G01B 7/016* (2006.01)

(52) U.S. Cl.
 CPC .............. *G01B 7/28* (2013.01); *G01B 7/016* (2013.01)

(58) Field of Classification Search
 CPC .................................. G01B 7/28; G01B 7/016
 See application file for complete search history.

(56) References Cited

U.S. PATENT DOCUMENTS

| | | | |
|---|---|---|---|
| 6,598,308 B1 * | 7/2003 | Johansson | G01B 5/207 |
| | | | 33/608 |
| 7,275,335 B2 * | 10/2007 | Holec | G01B 5/0025 |
| | | | 33/784 |
| 11,376,696 B2 * | 7/2022 | Karimi Jahromi | |
| | | | B23D 57/0061 |
| 2012/0110867 A1 * | 5/2012 | Molina | G01B 3/205 |
| | | | 33/608 |
| 2023/0158625 A1 * | 5/2023 | Jung | B23Q 11/0028 |
| | | | 408/186 |

FOREIGN PATENT DOCUMENTS

| | | | | |
|---|---|---|---|---|
| CN | 114964072 B | * | 7/2025 | G01B 11/0608 |
| WO | WO-2009152622 A1 | * | 12/2009 | G01B 7/28 |

* cited by examiner

*Primary Examiner* — Yaritza Guadalupe-Mccall
(74) *Attorney, Agent, or Firm* — Dergosits & Noah LLP; Todd A. Noah

(57) ABSTRACT

A gantry is disclosed that mounts on rails within a server rack. The gantry provides for the stable and repeatable placement of a measurement probe that is oriented to determine the sag of a server by measuring the distances along the Z-axis from the probe to a server at different locations in a XY plane defined by the gantry.

20 Claims, 11 Drawing Sheets

CHASSIS SAG AND BOW MEASUREMENT SYSTEM

BACKGROUND

Currently there are many ways to take measurements of sag and bow on a server chassis—where chassis sag is downward deflection of a chassis basepan and chassis bow is upward deflection of a chassis cover. Practically every engineering team has a different way of performing the testing. This results in inconsistencies amongst the various projects, and an inability to perform repeatable testing.

A current method uses a probe that is subject to flexing and inconsistent connection. This results in skewed data, which necessitates re-performing measurements to obtain more accurate data. This method also uses a plate that is unique to each rack and that mounts to the front of the rail mounting brackets on the rack. The front of the rail mounting brackets are used as the fixed point in the X direction. To perform this test on a different rack profile, a new metal plate must be outsourced, or adapters must be made, adding complexity and time to the test procedure. For measurements in the Y direction, the server must be pulled out from the rack to a certain point, which introduces rail sag (something that is common on many projects), which prevents the data collected from necessarily corresponding to the server in the fully seated position. Furthermore, a laptop is needed to perform this test, making it inconvenient due to the need for an additional power source and the need to run various delicate wires. Finally, multiple engineers are required to place the probe, read the data, and document the results.

Thus, what is needed is an apparatus to facilitate the reliable and efficient measurement of sag on a server chassis.

BRIEF DESCRIPTION OF THE DRAWINGS

The embodiments are illustrated by way of example and not limitation in the accompanying drawings, in which like references indicate similar elements, and in which.

DETAILED DESCRIPTION

In embodiments, measurement system 100 (FIG. 1), 200 (FIG. 3), 300 (FIG. 8) include an XY gantry (gantry and frame are interchangeable in this disclosure) and a range finder oriented to determine the distance of a server above (or below when reoriented) a plane of the frame. The embodiments mount on rails within a server rack and provide for the stable and repeatable placement of range finder and for smooth transitions of the range finder to different locations of interest. In some embodiments, the range finder is a measurement probe that includes a linear gage with a roller ball style touch point. This eliminates the flexing and connection issues seen on the previously used probe. In addition, the measurement probe may include a digital readout, which may be a remote digital readout, which eliminates any need for a laptop. In other embodiments, the range finder may be an optical range finder such as a laser range finder.

Embodiments of the gantry and range finder allow the range finder to move freely to any point within a plane within the gantry and for the gantry to be relocated to a different rack chassis without the need for special adaptors. Some embodiments may be constructed using carbon steel linear rods and linear bearings, which provide for the smooth and straight movement of the range finder. In addition, the gantry and range finder of embodiments reduces inaccuracies that arise due to the gantry not being level—or parallel to the chassis to be measured. Because, in some embodiments, the existing rail sets of the project rack may be used to mount the gantry, the gantry is registered properly—in parallel with the chassis.

In embodiments, the gantry may be mounted directly beneath or directly above the server being measured using rails previously mounted on the rack. The rails provide a plane that may be referenced in measurements: from that plane to the bottom of a chassis installed above the plane, and from that plane to the top of a chassis installed below the plane. The presence of such rails in racks in general, allows the gantry to be quickly modified to fit a range of rack dimensions. For example, in an embodiment, a set of rails that are specific to the project rack may be mounted to the gantry, allowing the gantry to be quickly re-positioned into rack slots that are configured to accept the set of rails. For a rack of different length and width dimensions, extra gantry side members may be provided that allow the gantry to be modified to accommodate the different rack dimensions.

Figure 1:
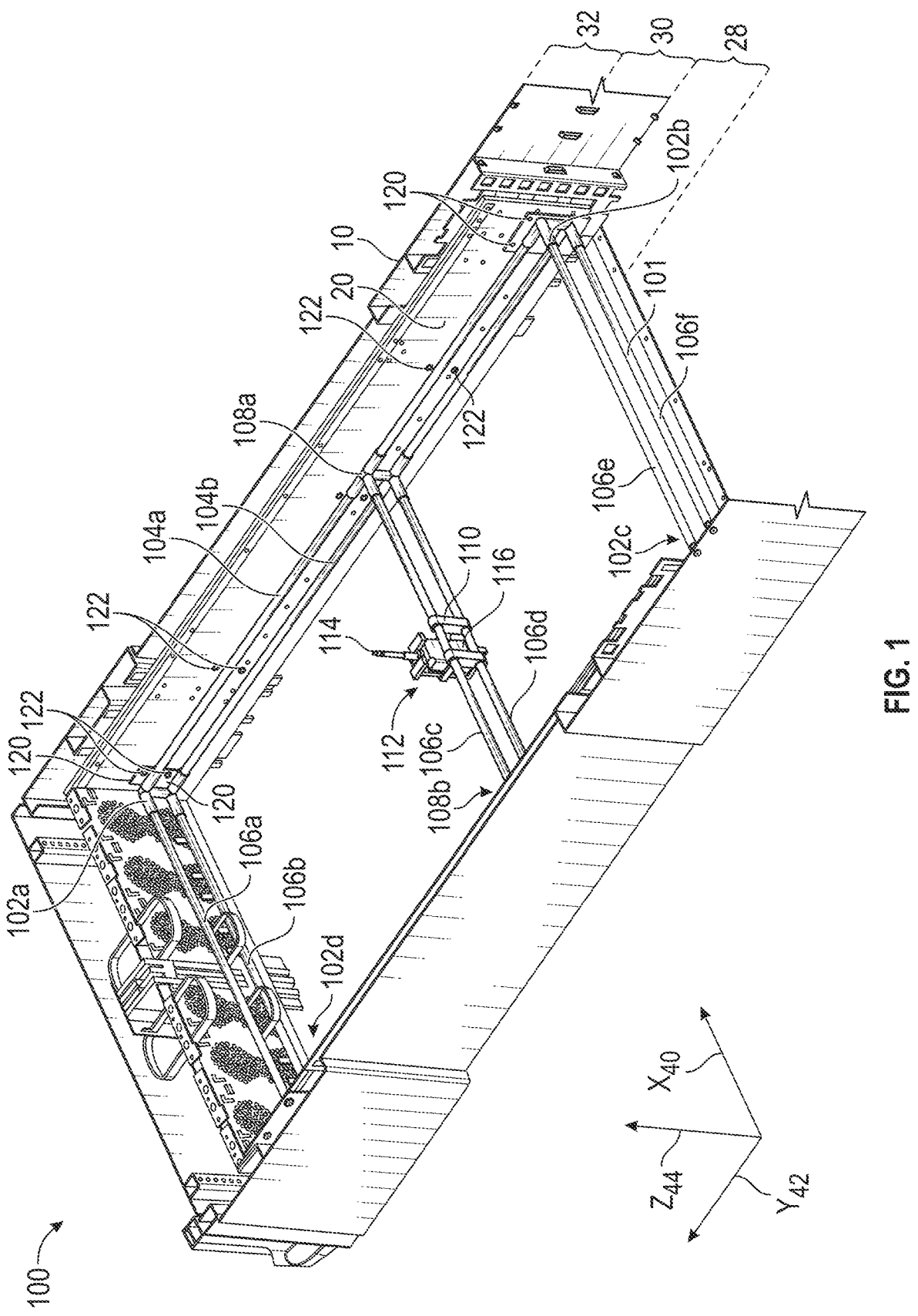
FIG. 1 is an upper front left isometric view of an installed embodiment of a measurement system.

FIG. 1 is an upper front left isometric view of an installed embodiment of a measurement system 100. In FIG. 1, rack 10 includes a rack rail 20 on a first side. An identical parallel rack rail is located on the other side of rack 10 and obscured. Rack rail 20 is 2U in height with a first slot 30 of height U and second slot 32 of height U. Measurement system 100 is installed in rack rail 20 and oriented to determine the sag of a server if that server were installed in a slot above slot 32. Measurement system 100 includes a frame 101 and a gauge 112. Frame 101 may include corner brackets 102a . . . 102d connected by elongated members 104a . . . 104d and 106a, 106b, 106e, 106f, such that elongates members 104a, 104c, 106a and 106e form an upper portion of frame 101 and elongated members 104b, 104d, 106b and 106f form a lower portion of frame 101. In an embodiment, elongated members 104a . . . 104d and 106a, 106b, 106c, 106f are cylindrical shafts and may be constructed of carbon steel. While frame 101 is partially obscured by rack 10, frame 101 is symmetrical about a center plane and description of the visible side of frame 101 applies to the obscured section. Thus, corner brackets 102a . . . 102d and elongated members 104a . . . 104d and 106a, 106b, 106e, 106f combine to provide structural rigidity to frame 101. Corner brackets 102a . . . 102d are connected to rack rails 20 by fasteners 120, which fixes the position of rigid frame 101 within rack slot 30.

In an embodiment, elongated members 104a, 106a, 104d and 106e and elongated members 104b, 106b, 104d and 106f can be welded together at each corner or formed from a single piece of material that is welded in one corner. In this embodiment, corner brackets 102a . . . 102d are not implemented and elongated members 104a . . . 104d are connected to rails by fasteners 120.

Figure 2:
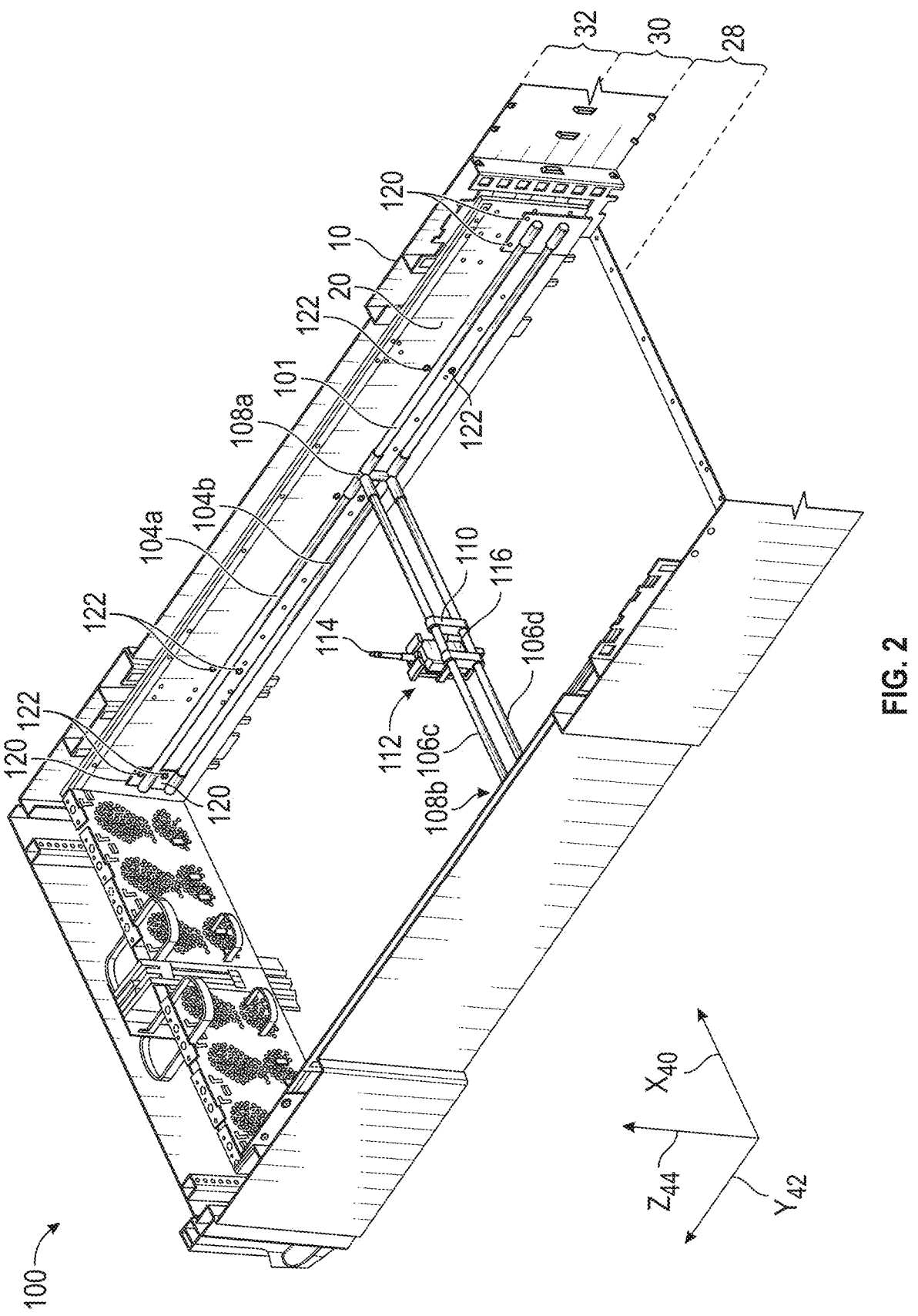
FIG. 2 is an upper front left isometric view of an installed embodiment of a measurement system.

As shown in FIG. 2, in an embodiment, elongated members 106a, 106b, 106e and 106f of FIG. 1 may not be included in frame 101 and elongated members 104a . . . 104d are connected to rails 20 by fasteners 120. In FIG. 2, elongated members 104c and 102 are not shown as they are obscured by rack 10 and rack rail 20. Fasteners 120 fix the position of rigid frame 101 within rack slot 30.

Referring back to FIG. 1, intermediate sliding brackets 108a, 108b are connected to elongated members 104a . . . 104d of rigid frame 101. Brackets 108a, 108b are slidably connected, perhaps incorporating linear bearings, and moveable along Y-axis 42 with respect to frame 101. In an embodiment, intermediate sliding brackets 108a, 108b, when they move, maintain elongated members 106c, 106d oriented perpendicularly to elongated members 104a . . . 104d.

A center sliding bracket 110 is connected to elongated members 106c, 106d. Bracket 110 is slidably connected, perhaps incorporating linear bearings, and moveable along X-axis 40 with respect to frame 101. In an embodiment, the sag (Z-axis 44) range finder is a linear gauge 112 connected to center bracket 110, which includes a probe 114 oriented to measure a distance in Z-axis 44 between gauge 112 and a server when a server is mounted in slot 32. Linear gauge 112 may be provided with an optional display 116. Display 116 may be visible from the open end of rack 10 (the lower right in FIG. 1) and may display the Z-axis distance measured by probe 114. In some embodiments, display 116 may also provide a distance of probe 114 along X-axis 40 and a distance of probe 114 along Y-axis 42.

Thus, an embodiment of the measurement system provides for positioning probe 114 at a known (X, Y) location on a plane within rigid frame 101 and determining at each (X, Y) location a distance Z from frame 101 to a server in slot 32. The variation between Z measurements indicates the sag of the server at the different (X, Y) locations.

A typical feature of rails 20 is that they are provided with many mounting holes 122 and fasteners 120 may use these mounting holes with the result that frame 101 may be consistently located at the same relative position within the various slots of rack 10.

In an embodiment, bracket 110 is configured to allow gauge 112 to be inverted so that probe 114 points in the negative Z 44 direction, which allows gauge 112 to determine the sag of an upper surface of a server mounted in a rack slot 28 situated below rack slot 30.

Figures 3, 4:
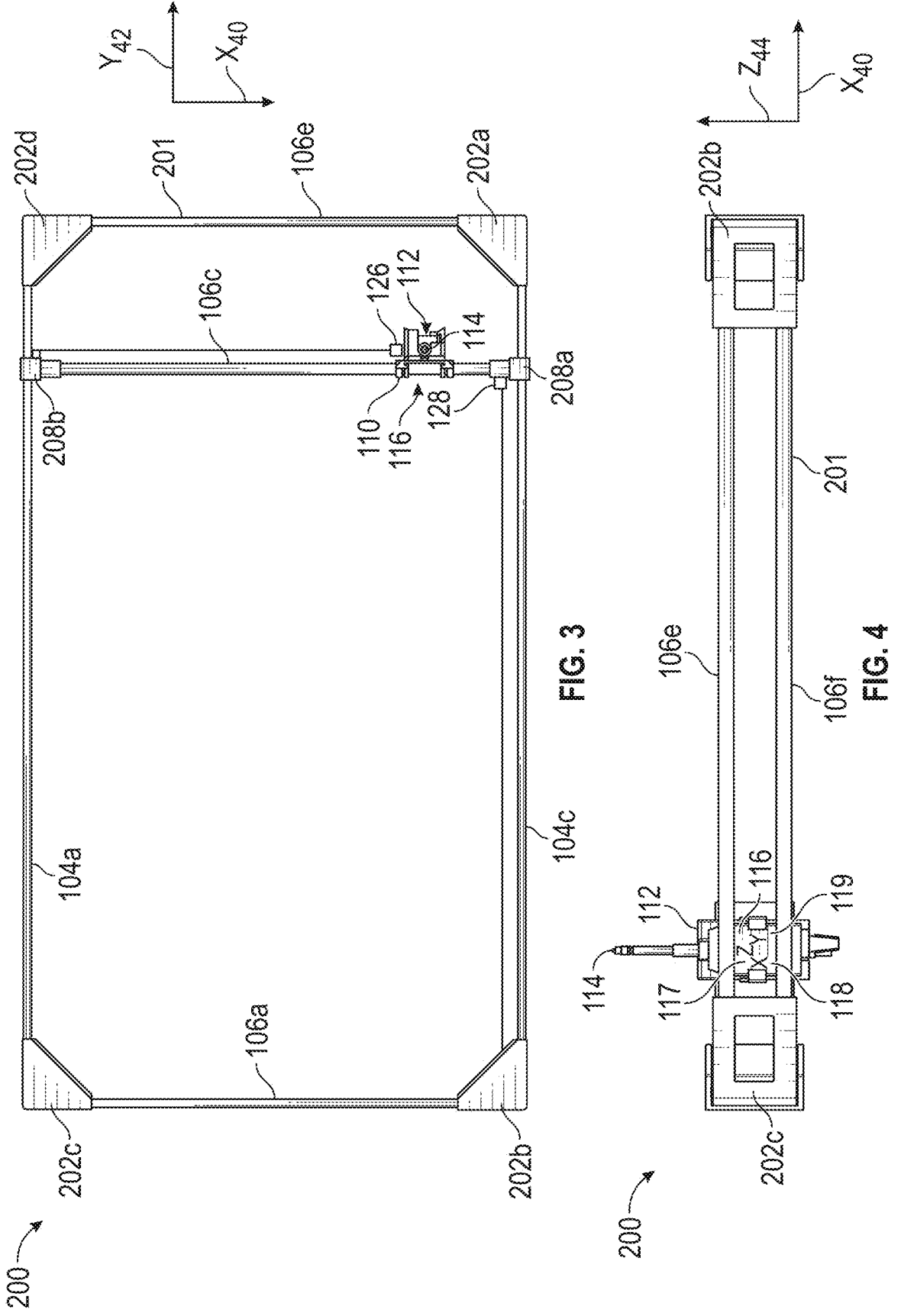
FIG. 3 is a top view of an embodiment of a measurement system.
FIG. 4 is a front view of the embodiment of a measurement system of FIG. 2.

FIG. 3 is a top view of an embodiment of a measurement system 200. Measurement system 200 differs from measurement system 100 in the configuration of corner brackets 202a . . . 202d and intermediate brackets 208a, 208b. Corner brackets 202a . . . 202d provide increased structural rigidity by having a triangular shape that reduces flex about the Z-axis. Similarly, intermediate brackets 208a, 208b provide increased rigidity by having additional mass at the junction of elongated members 104a . . . 104d and 106c, 106d.

FIG. 3 illustrates X and Y axis range finders, i.e., an X-axis draw wire gauge 126 and a Y-axis draw wire gauge 128, the output of which is provided to display 116 via wired connections (not shown). As shown, the origin of the (X, Y) coordinate system is near corner bracket 202c. With measurement system 200, a standardized measurement of servers at specific (X, Y) locations will be more efficient, since the (X, Y) location of probe 114 will be visible on display 116 with movement of bracket 110.

FIG. 4 is a front view of measurement system 200 of FIG. 2. In FIG. 3, display 116 is displaying a z data reading 117 from data provided by gauge 112, an x data reading 118 from data provided by draw wire gauge 126 (FIG. 2), and a y data reading 119 from data provided by draw wire gauge 128 (FIG. 2). In an embodiment, display 116 may be remote from gauge 112 for easier viewing. In an embodiment, x data reading 118 and y data reading 119 are optional and the (X, Y) location of probe 114 may be determined by manual measurement of its position.

Figure 5:
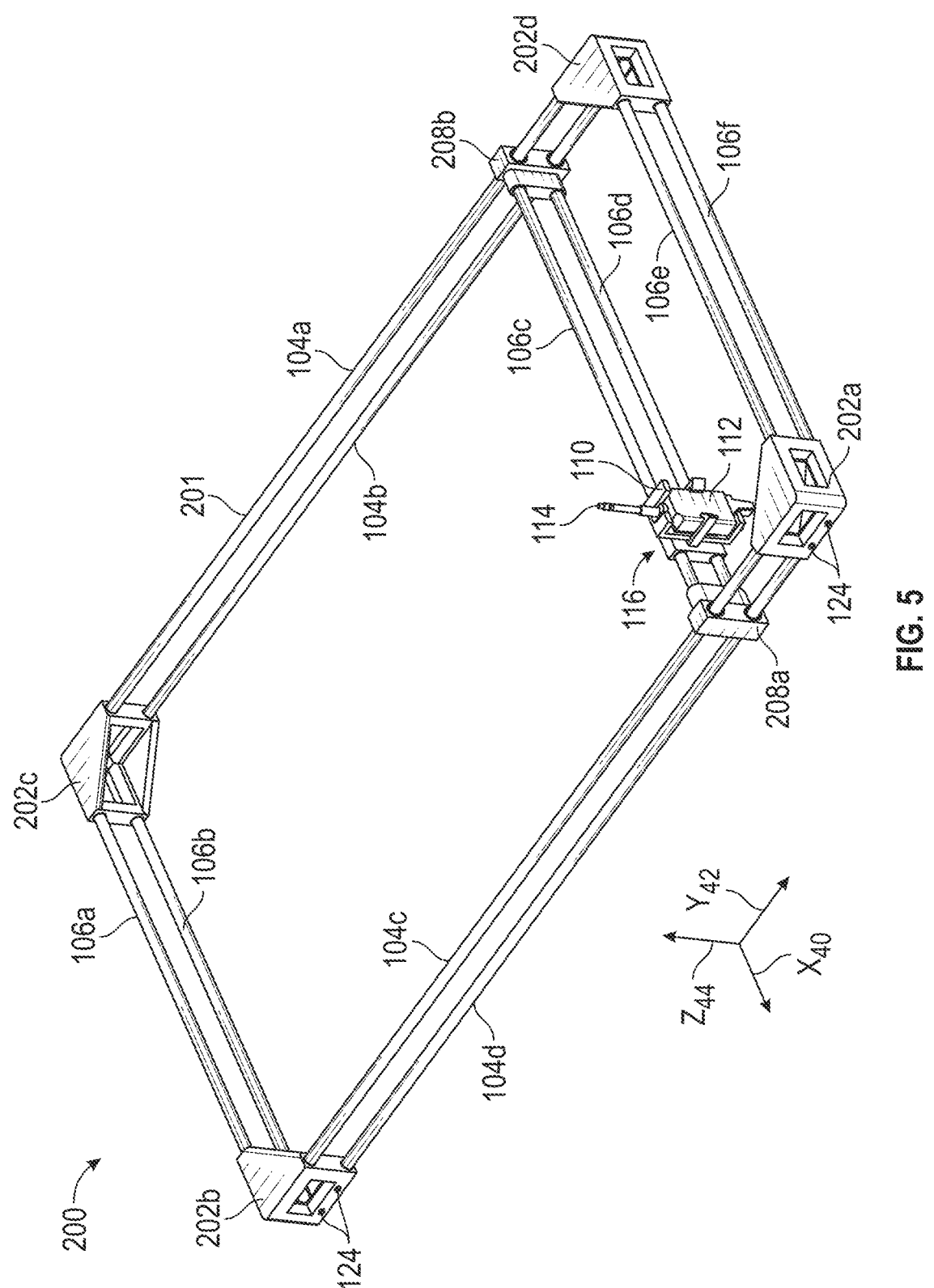
FIG. 5 is an upper rear right isometric view of the embodiment of a measurement system of FIG. 2.

FIG. 5 is an upper rear right isometric view of measurement system 200 of FIG. 2. In FIG. 54, corner brackets 202a, 202b are shown to include mounting holes 124 for connecting frame 201 to rack rail 20. FIG. 4 illustrates probe 114 oriented in the positive Z-axis 44 direction for measurement of sag on a server located above measurement system 200. In comparison, in FIG. 6, frame 201 is oriented as in FIG. 5, yet gauge 112 has been rotated within bracket 110 so that probe 114 is oriented in the negative Z-axis 44 direction for measurement of sag on a server located below measurement system 200.

Figure 7:
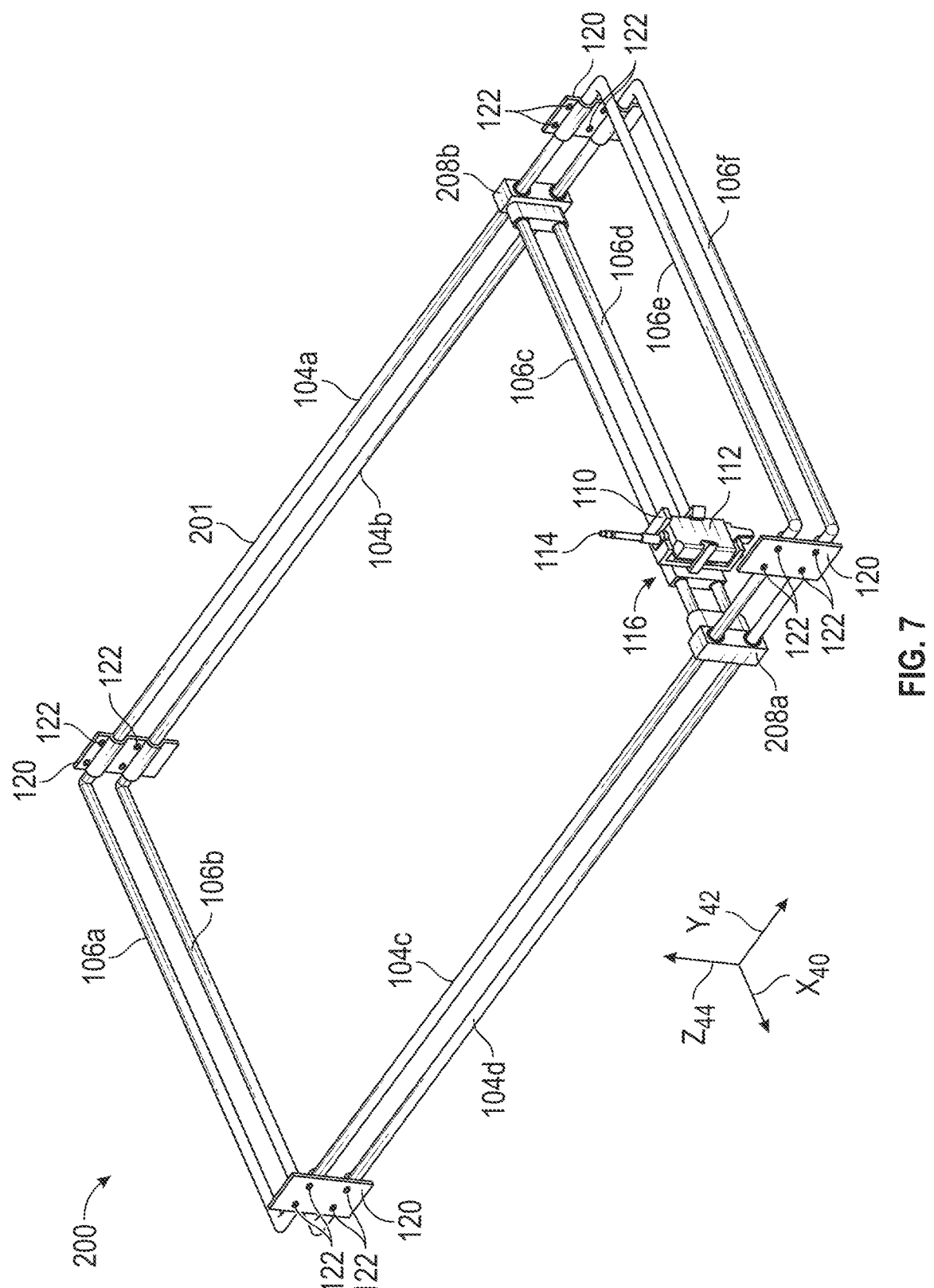
FIG. 7. is an upper rear right isometric view of an embodiment of a measurement system.

FIG. 7 illustrates an embodiment where elongated members 104a, 106a, 104d and 106e and elongated members 104b, 106b, 104d and 106f are welded together at each corner or formed from a single piece of material that is welded in one corner. In this embodiment, integrated elongated members 104a, 106a, 104d and 106e may be connected to integrated elongated members 104b, 106b, 104d and 106f, respectively, by small, elongated members oriented vertically in the corners in between (not shown) that are welded in each corner. In this embodiment, corner brackets 202a . . . 202d are not implemented and fasteners 120 and intermediate brackets 208a, 208b provide structural rigidity to frame 101.

Figure 6:
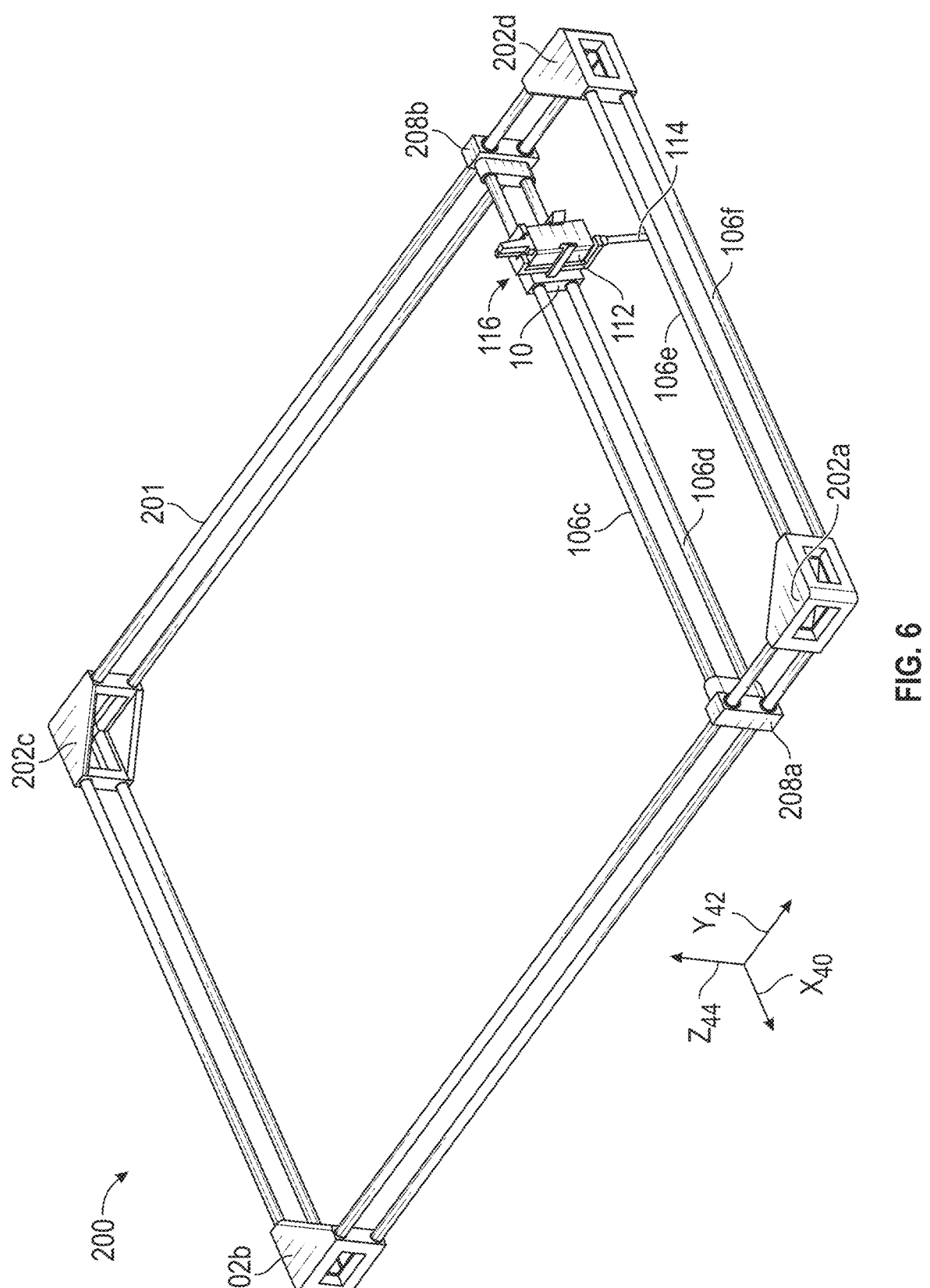
FIG. 6 is an upper rear right isometric view of the embodiment of a measurement system of FIG. 3 in a different configuration.
Figure 8:
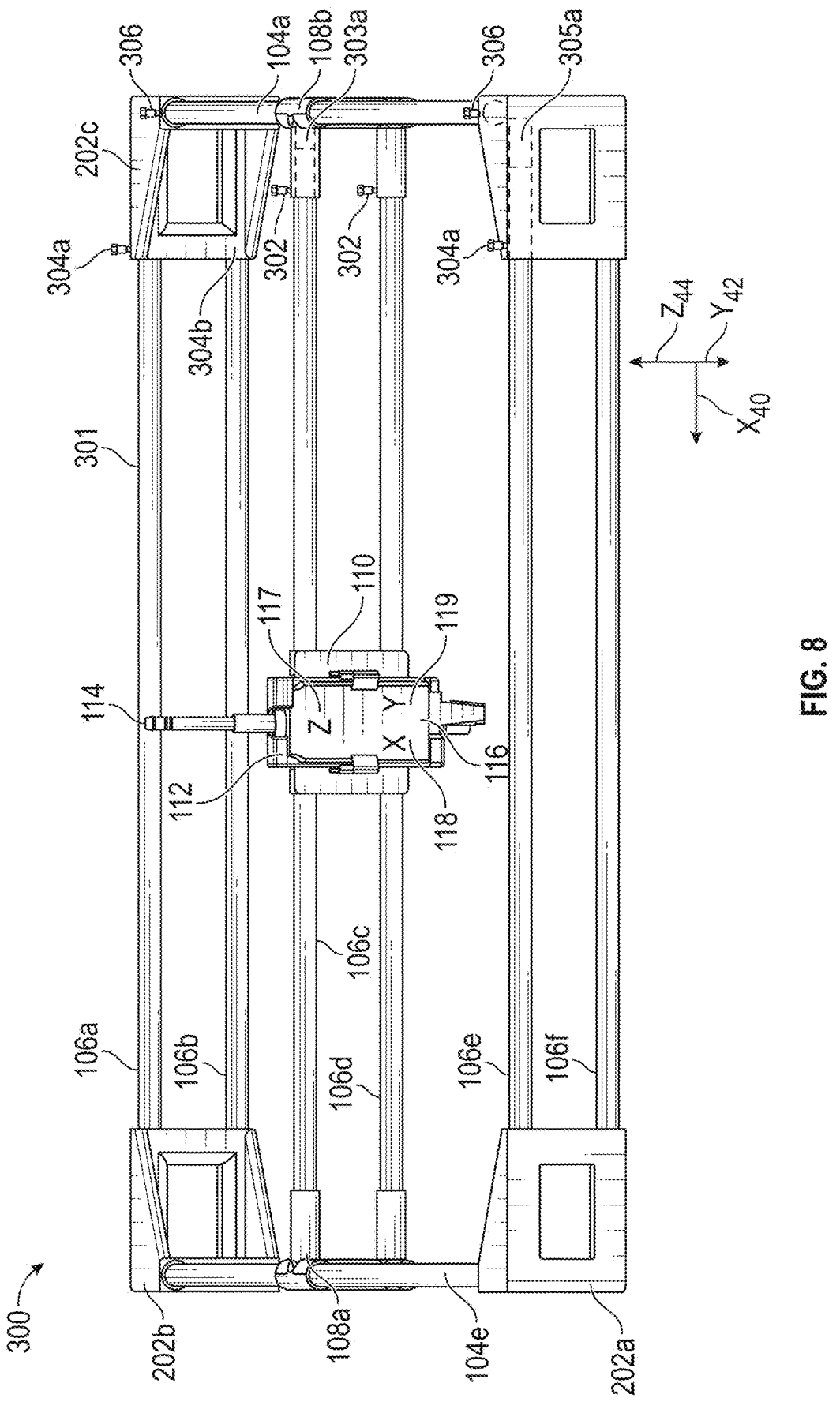
FIG. 8 is an elevated front view of an embodiment of a measurement system.

FIG. 8 is an elevated front view of an embodiment of a measurement system 300 with a frame 301. In FIG. 6, frame 301 includes corner brackets 202a . . . 202d of measurement system 200 and the intermediate brackets 108a, 108b of measurement system 100. Measurement system 300 is otherwise the same as system 200. FIG. 8 illustrates the adjustable nature of frames 101, 201, 301 so that they may be adapted to server racks of different dimensions. To provide this adjustability, bores 305a, 307a in corner bracket 202d are configured to provide additional depth so that elongated members 106e, 104a may be inserted further into bracket 202d to adjust frame 301 to fit a slot of lesser width or length. Set screws 304a, 306 may be used to fix members 106c, 104a in the desired positions. Corner brackets 102a . . . 102d (system 100) may be provided with similar adjustability. In FIG. 8, bore 303a in intermediate bracket 108b is also configured to provide additional depth so that elongated member 106c may be inserted further into bracket 108b to fit a slot of lesser width. Intermediate bracket 208b (system 200) may be provided with this same adjustability. The bores and set screws also provide for the elongated members to be withdrawn to adjust for slots of greater width or length. Bores 305a, 307a, and 303a are exemplary and, in embodiments, each bore that receives a terminal end of one of elongated members 106a . . . 106f or 104a . . . 104d provides such adjustability. Set screws 304a may be located in different locations on the bracket, e.g., as shown with set screw 304b, for better access. After adjustment for one slot in a server rack, it is assumed that other slots in that same server rack with be similar and a frame will not need further adjustment in order to measure sag from different slots in that same server rack.

Figure 9:
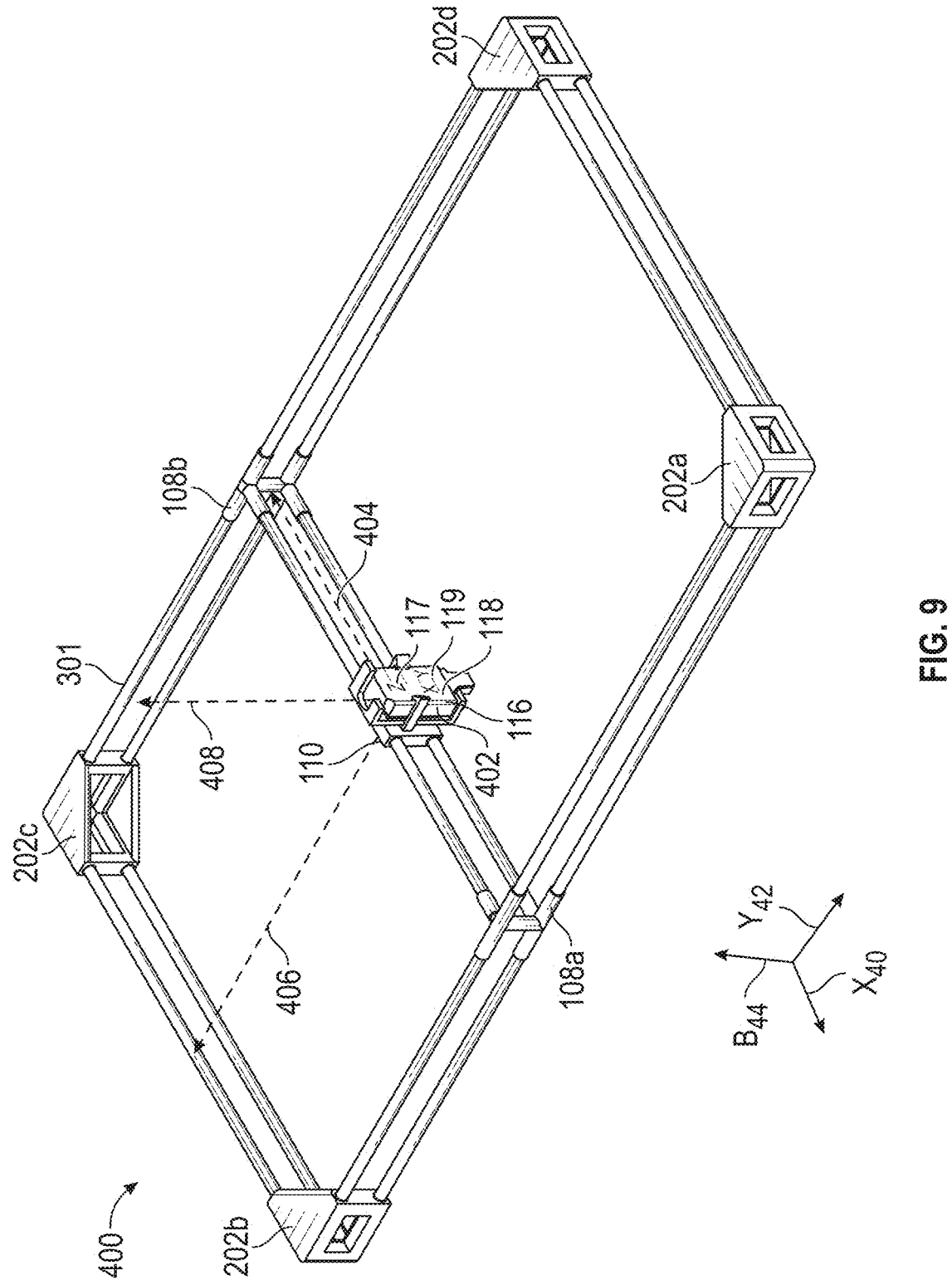
FIG. 9 is an upper rear right isometric view of an embodiment of a measurement system.

FIG. 9 is an upper rear right isometric view of an embodiment of a measurement system 400. In FIG. 9, range finder 402 is an optical range finder, e.g., a laser range finder, with z data reading 117 from data provide by an optical beam 408, x data reading 118 from data provided by an optical beam 404, and y data reading 119 from data provided by an optical beam 406.

Figure 10:
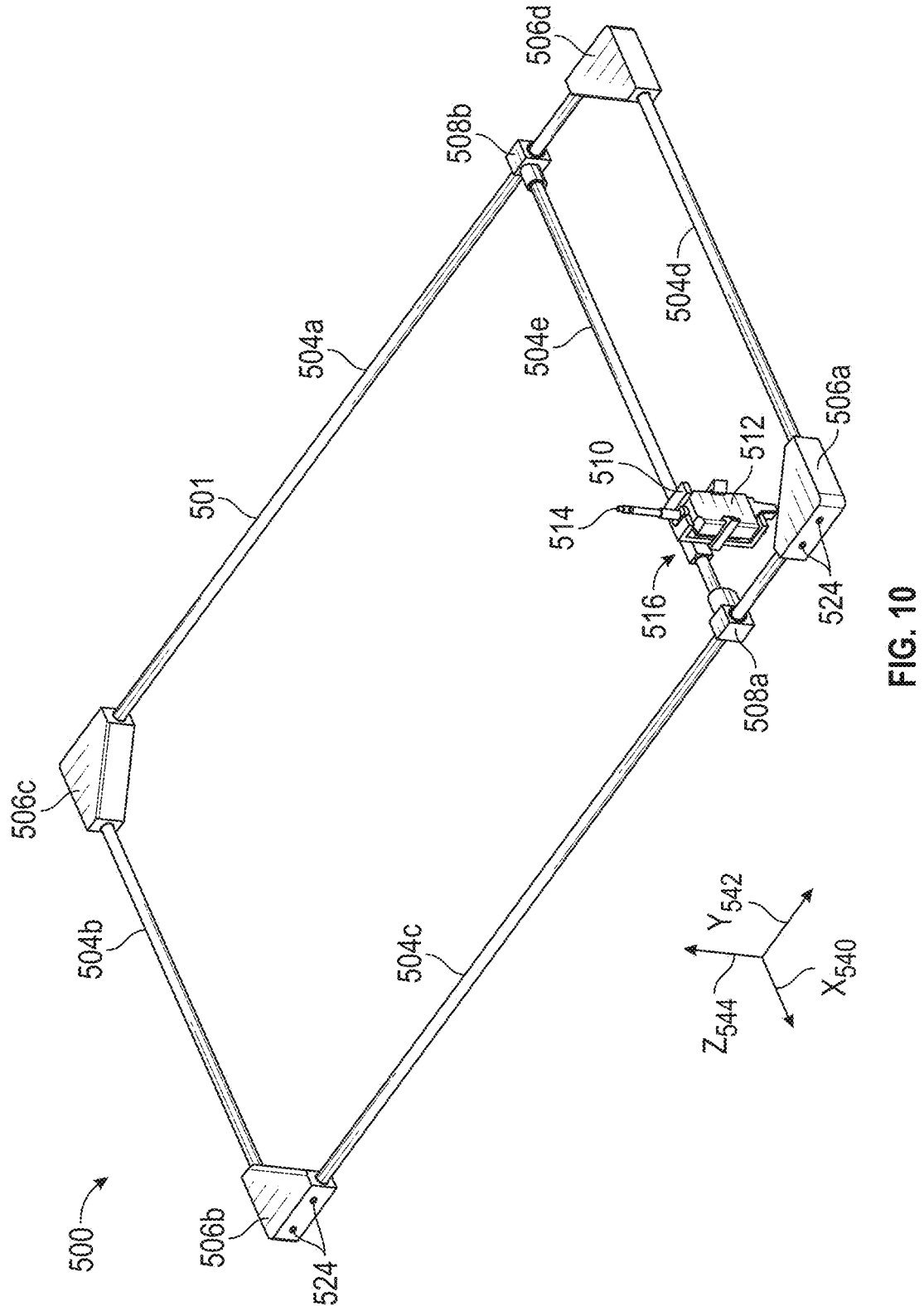
FIG. 10 is an upper rear right isometric view of an embodiment of a measurement system.

FIG. 10 is an upper rear right isometric view of an embodiment of a measurement system 500. In FIG. 10, frame 501 includes elongated members 504a . . . 504d. Elongated members 504a . . . 504d may be connected to each other by corner brackets 506a . . . 506d. Brackets 508a, 508b are slidably connected, perhaps incorporating linear bearings, and moveable along Y-axis 542 with respect to frame 501. In an embodiment, intermediate sliding brackets 508a, 508b, when they move, maintain elongated members 504b, 504d oriented perpendicularly to elongated members 504a, 504c.

As further shown in FIG. 10, a center sliding bracket 510 is connected to elongated member 504c. Bracket 510 is slidably connected, perhaps incorporating linear bearings, and moveable along X-axis 540 with respect to frame 501. In this embodiment, the slidable connection of bracket 510 to elongated member 504e is configured such that bracket 510 cannot rotate along the Y-axis 542. This may include a frictional connection of sliding bracket 510 to elongated member 504c that prevents rotation of bracket 510 along the Y-axis 542 yet enables the bracket 510 to slide along the elongated member 504e along the X-axis 540 direction upon the application of a small force. Alternatively, elongated member 504e can have a non-circular cross-section, including but not limited to square, rectangular or triangular, which would prevent bracket 510 from rotating along the Y-axis 542. In an embodiment, the sag (Z-axis 544) range finder is a linear gauge 512 connected to center bracket 510, which includes a probe 514 oriented to measure a distance in Z-axis 544 between gauge 512 and a server when a server is mounted in a slot in the rail (not shown). In FIG. 10, corner brackets 506a, 506b are shown to include mounting holes 524 for connecting frame 501 to rack rail 20 (not shown). FIG. 10 illustrates probe 514 oriented in the positive Z-axis 544 direction for measurement of sag on a server located above measurement system 500, but probe 514 may be oriented in the negative Z-axis direction for measurement of sag on a server located below measurement system 500.

Figure 11:
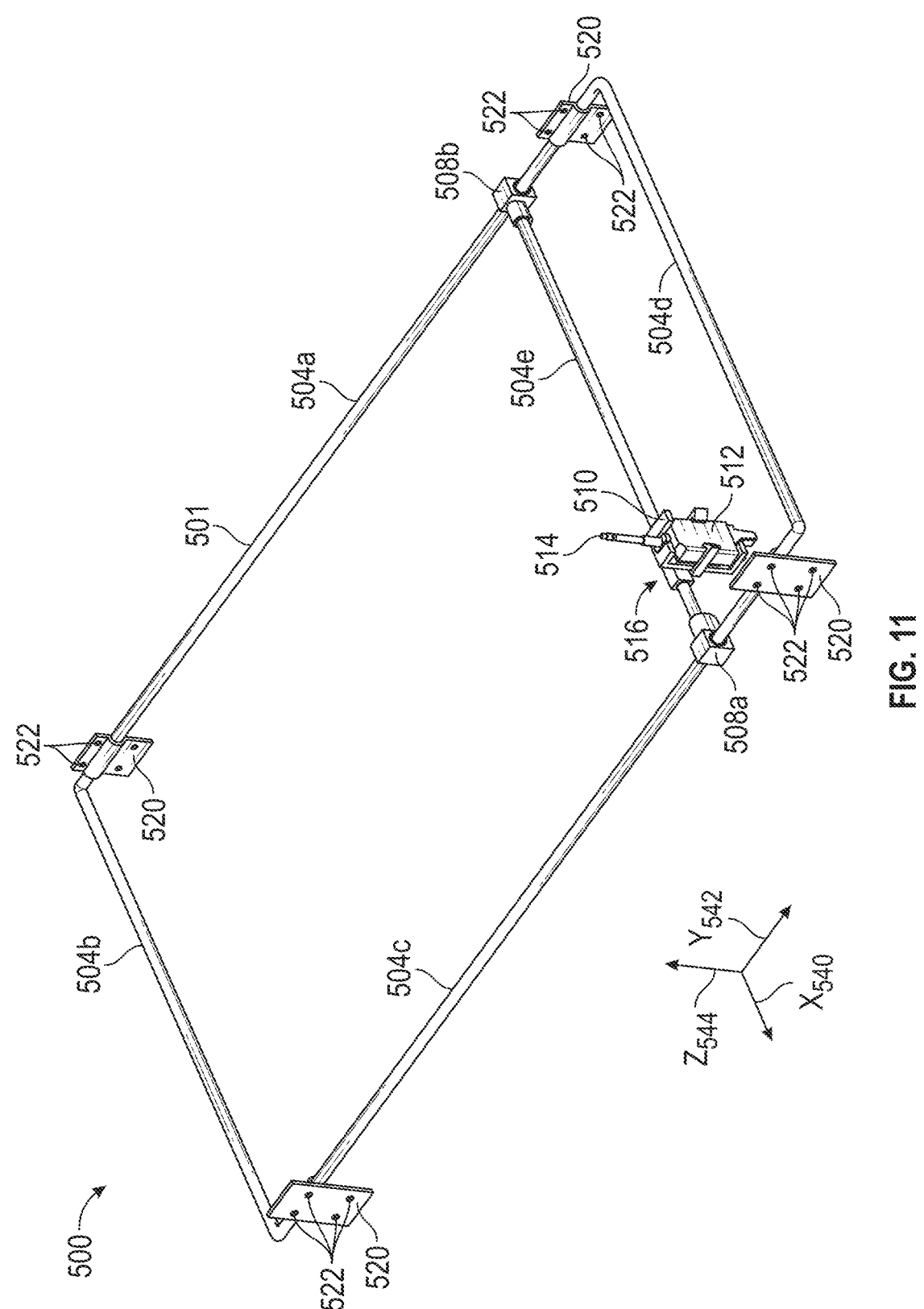
FIG. 11 is an upper rear right isometric view of an embodiment of a measurement system.

FIG. 11 is an upper rear right isometric view of an embodiment of a measurement system 500. In this embodiment, elongated members 504a . . . 504d may be welded to each other at each corner or formed from a single piece of material and welded at one of the corners. Since frame 501 does not include an upper elongated member portion and a lower elongated member portion, elongated members 504a . . . 504d may be made from any known material that would eliminate the elongated members from bowing or sagging. In this embodiment, corner brackets 506a . . . 506d (shown in FIG. 10) are not implemented and elongated members 504a . . . 504d are connected to rails (not shown) by fasteners 520. In FIG. 11, fasteners 520 are shown to include mounting holes 522 for connecting frame 501 to rack rail 20 (not shown).

Figure 12:
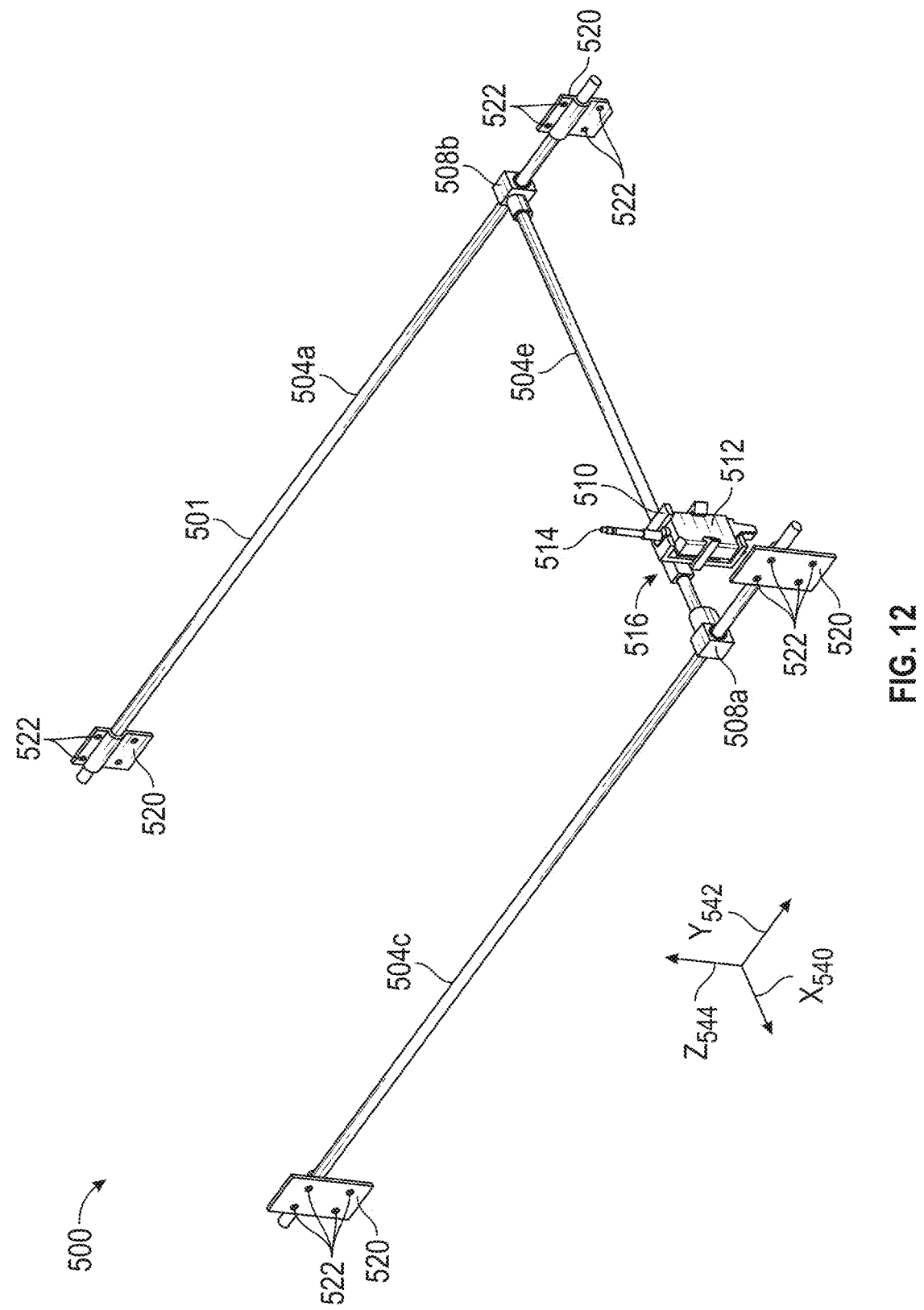
FIG. 12 is an upper rear right isometric view of an embodiment of a measurement system.

As shown in FIG. 12, in an embodiment, elongated members 504b, 504d of FIG. 11 may not be included in frame 501 and elongated members 504a, 504c are connected to rails 20 (not shown) by fasteners 520. Fasteners 520 fix the position of rigid frame 101 within rack slot 30. Since frame 501 does not include an upper elongated member portion and a lower elongated member portion, elongated members 504a and 504c may be made from any known material that would eliminate the elongated members from bowing or sagging. In this embodiment, elongated members 504a, 504c are connected to rails (not shown) by fasteners 520. In FIG. 12, fasteners 520 are shown to include mounting holes 522 for connecting frame 501 to rack rail 20 (not shown).

Embodiments provide many desirable features. A feature is that they are portable and maintain structural integrity even when testing is not being performed and the gantry and probe are in storage. A feature is that multiple engineering teams may use the same measurement device and procedure, which will likely improve the consistency of results through standardization. A feature is that the probe may be oriented to measure above or below the gantry for sag data collection allowing the operator to move the chassis, or re-orient the probe direction, instead of repositioning the measurement gantry. A feature is that, since both the gantry and the server being tested both mount to the rails of the rack, the relative position of the gantry will be in the same plane as the server being tested. A feature is that the use of the gantry eliminates the need to pull out the server to perform measurements along the Y-axis. A feature is that the digital read out and controls for zeroing the probe may be mounted directly to the gantry system, which increases the case of use and portability of the system. A feature is that, since in an embodiment the probe remains in the location it was last placed, the embodiment eliminates the need for two engineers to perform this testing-a test procedure using the gantry requires only a power source and a single engineer. A feature of one embodiment is that the gantry may be configured to be mounted in any position on the rack that provides at least three (3) open rack units (OU) of rack space.

Consistent with the foregoing, in at least one case referred to herein as Example A-1, an apparatus comprises: a frame including a first elongated member and first mounting points on a first side and a second elongated member and second mounting points on a second side parallel to the first side, the first and second elongated members lying in a first plane defined by a first axis perpendicular to the first and second elongated members and a second axis parallel to the first and second elongated members; a first cross member connected between the first elongated member and the second elongated member and movable with respect to the first and second elongated members parallel to the second axis; a first bracket connected to the first cross member and moveable along the first cross member between the first and second elongated members; a first range finder connected to the first bracket and oriented parallel to a third axis perpendicular to the first plane, the range finder providing data indicating a distance along the third axis.

In another case referred to herein as Example A-2, the apparatus of Example A-1, or any other exemplary embodiment described herein, may further comprise a second range finder oriented parallel to the first axis and a third range finder oriented parallel to the second axis, the second range finder providing data indicating a second distance along the first axis and the third range finder providing data indicating a third distance along the third axis.

In another case referred to herein as Example A-3, the apparatus of Example A-2, or any other exemplary embodiment described herein, may be further limited wherein the first range finder includes a gauge including a probe and the first distance includes a first length the probe has extended from an initial position.

In another case referred to herein as Example A-4, the apparatus of Example A-3, or any other exemplary embodiment described herein, may be further limited wherein the second range finder includes a first draw wire gauge or a first linear encoder, and the third range finder includes a second draw wire gauge or a second linear encoder.

In another case referred to herein as Example A-5, the apparatus of Example A-4, or any other exemplary embodiment described herein, may be further limited wherein the frame includes first, second, third, and fourth corner brackets, the first and second corner brackets configured to be connected to a first rail oriented parallel to the first side and the third and fourth corner brackets configured to be connected to a second rail oriented parallel to the second side.

In another case referred to herein as Example A-6, the apparatus of Example A-5, or any other exemplary embodiment described herein, may be further limited wherein the first elongated member is configured to be connected to the first and second corner brackets and the second elongated member is configured to be connected to the third and fourth corner brackets, the first and second corner brackets repositionable with respect to the first elongated member along the second axis, the third and fourth corner brackets repositionable with respect to the second elongated member along the second axis.

In another case referred to herein as Example A-7, the apparatus of Example A-6, or any other exemplary embodiment described herein, may be further limited wherein the frame includes first and second inner brackets, the first inner bracket connected to the first elongated member and movable with respect to the first elongated members parallel to the second axis, the second inner bracket connected to the second elongated member and movable with respect to the second elongated member parallel to the second axis, the first and second inner brackets cooperating to maintain the first cross member parallel to the first axis.

In another case referred to herein as Example A-8, the apparatus of Example A-7, or any other exemplary embodiment described herein, may further comprise third and fourth elongated members oriented parallel to the first cross member, the third elongated member connected between the second and third corner brackets and the fourth elongated member connected between the fourth and first corner brackets, wherein: the first and second inner brackets are repositionable with respect to the first cross member along the first axis, the second and third corner brackets are repositionable with respect to the third elongated member along the first axis, and the fourth and first corner brackets are repositionable with respect to the fourth elongated member along the first axis.

In another case referred to herein as Example A-9, the apparatus of Example A-8, or any other exemplary embodiment described herein, may be further limited wherein the first range finder is repositionable with respect to the first bracket such that the first range finder may be oriented in a first direction parallel to the third axis and a second direction opposite the first direction.

In another case referred to herein as Example A-10, the apparatus of Example A-1, or any other exemplary embodiment described herein, may be further limited wherein the range finder includes a first optical range finder and the distance along the third axis includes a first length from the first optical range finder.

In another case referred to herein as Example A-11, the apparatus of Example A-10, or any other exemplary embodiment described herein, may further comprise a second optical range finder oriented parallel to the first axis and a third optical range finder oriented parallel to the second axis, the second optical range finder providing data indicating a second distance along the first axis and the third optical range finder providing data indicating a third distance along the third axis.

Consistent with the foregoing, in at least one case referred to herein as Example B-1, a method for measuring chassis sag or bow, the method comprising: positioning a frame in a rack, the frame having a first range finder that is at least one of slidably or rotatably mounted on an elongated frame cross-member, the elongated frame cross-member being in a first position with respect to the frame and slidable within a plane parallel to the frame, the first range finder being configured to measure a first distance relative to the first range finder and a first chassis installed in the rack, the first distance being measured in one of a first direction perpendicular to the plane or a second direction perpendicular to the plane; determining a first position of the first range finder in the plane; measuring the first distance relative to the first range finder and the first chassis in one of the first direction or the second direction; and determining, using the first distance, at least one of a first sag value or a first bow value of the first chassis at the first position.

In another case referred to herein as Example B-2, the method of Example B-1, or any other exemplary embodiment described herein, may further comprise positioning the frame in the rack below the first chassis such that the first range finder measures the first distance relative to the first range finder and the first chassis mounted above the first range finder in the first direction and determines the first sag value.

In another case referred to herein as Example B-3, the method of Example B-1, or any other exemplary embodiment described herein, may further comprise positioning the frame in the rack above the first chassis such that the first range finder measures the first distance relative to the first range finder and the first chassis mounted below the first range finder in the second direction and determines the first bow value.

In another case referred to herein as Example B-4, the method of Example B-1, or any other exemplary embodiment described herein, may be further limited wherein positioning the frame in the rack includes positioning the frame in the rack below the first chassis and above a second chassis, the method further comprising: rotating the first range finder on the frame cross-member; measuring a second distance relative to the first range finder and the second chassis in the second direction; and determining, using the second distance, the first bow value of the second chassis at the first position.

In another case referred to herein as Example B-5, the method of Example B-2, or any other exemplary embodiment described herein, may further comprise sliding at least one of the frame cross-member along a first axis within the plane parallel to the frame or the first range finder along a second axis within the plane perpendicular to the first axis; determining a second position of the first range finder in the plane; measuring a second distance relative to the first range finder and the first chassis in the first direction; and determining, using the second distance, a second sag value of the first chassis at the second position.

In another case referred to herein as Example B-6, the method of Example B-3, or any other exemplary embodiment described herein, may further comprise: sliding at least one of the frame cross-member along a first axis within the plane parallel to the frame or the first range finder along a second axis within the plane perpendicular to the first axis; determining a second position of the first range finder in the plane; measuring a second distance relative to the first range finder and the first chassis in the second direction; and determining, using the second distance, a second sag value of the first chassis at the second position.

In another case referred to herein as Example B-7, the method of Example B-4, or any other exemplary embodiment described herein, may further comprise: sliding at least one of the frame cross-member along a first axis within the plane parallel to the frame or the first range finder along a second axis within the plane perpendicular to the first axis; determining a second position of the first range finder in the plane; measuring a third distance relative to the first range finder and the first chassis in the first direction at the second position of the first range finder; determining, using the third distance, a second sag value of the first chassis at the second position of the first range finder; rotating the range finder on the frame cross-member; measuring a fourth distance relative to the first range finder and the second chassis in the second direction at the second position of the first range finder; and determining, using the fourth distance, a second bow value of the second chassis at the second position of the first range finder.

In another case referred to herein as Example B-8, the method of Example B-1, or any other exemplary embodiment described herein, may be further limited wherein determining the first position of the first range finder in the plane comprises: determining a second distance of the first range finder along the first axis using a second range finder positioned parallel to the first axis; and determining a third distance of the first range finder along the second axis using a third range finder positioned parallel to the second axis parallel to the frame cross-member, the second distance and the third distance providing the first position of the first range finder.

In another case referred to herein as Example B-9, the method of Example B-1, or any other exemplary embodiment described herein, may further comprise: sliding at least one of the frame cross-member along a first axis within the plane parallel to the frame or the first range finder along a second axis within the plane perpendicular to the first axis; determining a second position of the first range finder in the plane; measuring a second distance relative to the first range finder and the first chassis in the second direction; and determining a first sage value or a first bow value of the first chassis as a difference between the first distance and the second distance.

The previous description is provided to enable any person skilled in the art to practice the various aspects described herein. In the embodiments, the separation of various system components in the embodiments described above should not be understood as requiring such separation in all embodiments. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. An apparatus including:
   a frame including a first elongated member and first mounting points on a first side and a second elongated member and second mounting points on a second side parallel to the first side, the first and second elongated members lying in a first plane defined by a first axis perpendicular to the first and second elongated members and a second axis parallel to the first and second elongated members;
   a first cross member connected between the first elongated member and the second elongated member and movable with respect to the first and second elongated members parallel to the second axis;
   a first bracket connected to the first cross member and moveable along the first cross member between the first and second elongated members; and
   a first range finder connected to the first bracket and oriented parallel to a third axis perpendicular to the first plane, the range finder providing data indicating a distance along the third axis.

2. The apparatus of claim 1, further including a second range finder oriented parallel to the first axis and a third range finder oriented parallel to the second axis, the second range finder providing data indicating a second distance along the first axis and the third range finder providing data indicating a third distance along the third axis.

3. The apparatus of claim 2, wherein the first range finder includes a gauge including a probe and the first distance includes a first length the probe has extended from an initial position.

4. The apparatus of claim 3, wherein the second range finder includes a first draw wire gauge or a first linear encoder, and the third range finder includes a second draw wire gauge or a second linear encoder.

5. The apparatus of claim 4, wherein the frame includes first, second, third, and fourth corner brackets, the first and second corner brackets configured to be connected to a first rail oriented parallel to the first side and the third and fourth corner brackets configured to be connected to a second rail oriented parallel to the second side.

6. The apparatus of claim 5, wherein the first elongated member is configured to be connected to the first and second corner brackets and the second elongated member is configured to be connected to the third and fourth corner brackets, the first and second corner brackets repositionable with respect to the first elongated member along the second axis, the third and fourth corner brackets repositionable with respect to the second elongated member along the second axis.

7. The apparatus of claim 6, wherein the frame includes first and second inner brackets, the first inner bracket connected to the first elongated member and movable with respect to the first elongated members parallel to the second axis, the second inner bracket connected to the second elongated member and movable with respect to the second elongated member parallel to the second axis, the first and second inner brackets cooperating to maintain the first cross member parallel to the first axis.

8. The apparatus of claim 7, the frame further including third and fourth elongated members oriented parallel to the first cross member, the third elongated member connected between the second and third corner brackets and the fourth elongated member connected between the fourth and first corner brackets, wherein:

the first and second inner brackets are repositionable with respect to the first cross member along the first axis, the second and third corner brackets are repositionable with respect to the third elongated member along the first axis, and the fourth and first corner brackets are repositionable with respect to the fourth elongated member along the first axis.

9. The apparatus of claim 8, wherein the first range finder is repositionable with respect to the first bracket such that the first range finder may be oriented in a first direction parallel to the third axis and a second direction opposite the first direction.

10. The apparatus of claim 1, wherein the range finder includes a first optical range finder and the distance along the third axis includes a first length from the first optical range finder.

11. The apparatus of claim 10, further including a second optical range finder oriented parallel to the first axis and a third optical range finder oriented parallel to the second axis, the second optical range finder providing data indicating a second distance along the first axis and the third optical range finder providing data indicating a third distance along the third axis.

12. A method for measuring chassis sag or bow, the method including:

positioning a frame in a rack, the frame having a first range finder that is at least one of slidably or rotatably mounted on an elongated frame cross-member, the elongated frame cross-member being in a first position with respect to the frame and slidable within a plane parallel to the frame, the first range finder being configured to measure a first distance relative to the first range finder and a first chassis installed in the rack, the first distance being measured in one of a first direction perpendicular to the plane or a second direction perpendicular to the plane;

determining a first position of the first range finder in the plane;

measuring the first distance relative to the first range finder and the first chassis in one of the first direction or the second direction; and determining, using the first distance, at least one of a first sag value or a first bow value of the first chassis at the first position.

13. The method of claim 12, positioning the frame in the rack below the first chassis such that the first range finder measures the first distance relative to the first range finder and the first chassis mounted above the first range finder in the first direction and determines the first sag value.

14. The method of claim 12, positioning the frame in the rack above the first chassis such that the first range finder measures the first distance relative to the first range finder and the first chassis mounted below the first range finder in the second direction and determines the first bow value.

15. The method of claim 12, wherein positioning the frame in the rack includes positioning the frame in the rack below the first chassis and above a second chassis, the method further comprising:

rotating the first range finder on the frame cross-member;

measuring a second distance relative to the first range finder and the second chassis in the second direction; and determining, using the second distance, the first bow value of the second chassis at the first position.

16. The method of claim 13, further comprising:

sliding at least one of the frame cross-member along a first axis within the plane parallel to the frame or the first range finder along a second axis within the plane perpendicular to the first axis;

determining a second position of the first range finder in the plane;

measuring a second distance relative to the first range finder and the first chassis in the first direction; and determining, using the second distance, a second sag value of the first chassis at the second position.

17. The method of claim 14, further comprising:

sliding at least one of the frame cross-member along a first axis within the plane parallel to the frame or the first range finder along a second axis within the plane perpendicular to the first axis;

determining a second position of the first range finder in the plane;

measuring a second distance relative to the first range finder and the first chassis in the second direction; and determining, using the second distance, a second sag value of the first chassis at the second position.

18. The method of claim 15, further comprising:

sliding at least one of the frame cross-member along a first axis within the plane parallel to the frame or the first range finder along a second axis within the plane perpendicular to the first axis;

determining a second position of the first range finder in the plane;

measuring a third distance relative to the first range finder and the first chassis in the first direction at the second position of the first range finder;

determining, using the third distance, a second sag value of the first chassis at the second position of the first range finder;

rotating the range finder on the frame cross-member;

measuring a fourth distance relative to the first range finder and the second chassis in the second direction at the second position of the first range finder; and determining, using the fourth distance, a second bow value of the second chassis at the second position of the first range finder.

19. The method of claim 12, wherein determining the first position of the first range finder in the plane comprises:

determining a second distance of the first range finder along the first axis using a second range finder positioned parallel to the first axis; and determining a third distance of the first range finder along the second axis using a third range finder positioned parallel to the second axis parallel to the frame cross-member, the second distance and the third distance providing the first position of the first range finder.

20. The method of claim 12, further comprising:

sliding at least one of the frame cross-member along a first axis within the plane parallel to the frame or the first range finder along a second axis within the plane perpendicular to the first axis;

determining a second position of the first range finder in the plane;

measuring a second distance relative to the first range finder and the first chassis in the second direction; and determining a first sage value or a first bow value of the first chassis as a difference between the first distance and the second distance.

* * * * *